INVENTOR.
KAROL T. DYCZYNSKI

March 3, 1959  K. T. DYCZYNSKI  2,875,518
PIPE CUTTING DEVICE

Filed Feb. 28, 1957  3 Sheets-Sheet 3

INVENTOR.
KAROL T. DYCZYNSKI
BY
Charles L. Lovercheck
ATTORNEY

United States Patent Office 2,875,518
Patented Mar. 3, 1959

2,875,518

PIPE CUTTING DEVICE

Karol T. Dyczynski, Erie, Pa., assignor to The Erie Tool Works, Erie, Pa., a corporation of Pennsylvania Application February 28, 1957, Serial No. 643,001

6 Claims. (Cl. 30—102)

This invention relates to tube and pipe cutters and, more particularly, to the type of tube cutters wherein the pipe is supported at one side and has a sharp cutting tool rotated around the opposite side thereof.

Tube cutters made according to previous designs often have two rollers rotatable about spaced fixed axes adapted to engage and support one side of a tube and a cutting wheel supported on a handle adapted to engage the opposite side of the tube, the cutting being urged into engagement with the tube by some urging means such as a rotating handle. When the handle of the prior tube cutter is swung about the tube, the cutting wheel will penetrate the surface of the tube. Therefore, by constantly urging the cutting wheel toward the tube as the handle is rotated, the cutting wheel will finally cut completely through the walls of the tube. This type of tube cutter is useful in cutting tubing of sizes between certain fixed limits for a given tubing cutter; however, when tubes larger than the maximum size or smaller than the minimum size for which the cutter was designed are to be cut, the prior tube cutters are very ineffective and inefficient in use.

The word "tube" as used herein refers to any pipe or tube regardless of material. The device will cut solid rods of small sizes.

Tube cutters have been made according to previous designs with two and sometimes three rollers supported on a fixed jaw and rotatable about spaced axes thereon. One of the axes was usually spaced apart from a second axis a short distance and the third axis was spaced from the second axis a greater distance so that a small tube could be supported by the first and second axes while a larger tube could be supported by the second and third axes while the tube was being cut by a movable cutting wheel. These prior cutters work satisfactorily on tubing of intermediate size but do not give good results on tubing of very small size and on large size tubing.

Prior tubing cutters of this description usually have the cutting wheel carried by a swinging lever, the swinging lever being actuated by a screw restrained to move linearly with relation to the cutter. This linear movement of the actuating member limits the position at which a force could be applied by the actuating member. Therefore, the size of tubing which could be cut efficiently is limited.

The cutting wheel on prior tubing cutters is a relatively thin disk made of hard material and rotatably attached to the tubing cutter frame by means of an axle. The cutting wheel is inclined to move out of alignment during the cutting operation. By providing screws engaging the cutting wheel from each side, the wheel in the tubing cutter disclosed herein is prevented from moving out of alignment. This provides an optional locking means which may substitute as a knife blade for cutting rods and tubular members made of elastomer materials. The screws will also lock the cutting wheel so that the wheel will act as a knife for cutting tubes made of flexible materials such as rubber and vinyl plastic.

It is, accordingly, an object of this invention to overcome the disadvantages and difficulties experienced with prior pipe cutters and, more particularly, it is an object of this invention to provide a pipe cutter which is simple in construction, economical to manufacture, and simple and efficient in operation.

Another object of the invention is to provide a tubing cutter which will cut tubing of sizes over a large range.

Still another object of this invention is to provide a tubing cutter having at least four rollers supported on fixed parallel spaced axes on a body and a cutting member swingably mounted on the handle of the cutter and swingable toward the rollers which may or may not be cutters.

A further object of this invention is to provide a tubing cutter having a cutting wheel with a means to hold the wheel against rotation so that the cutting wheel will, in effect, act as a knife for cutting tubing made of elastomer materials.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 6 is a partial end view showing the cutting wheel and support according to the invention.

Figure 1:
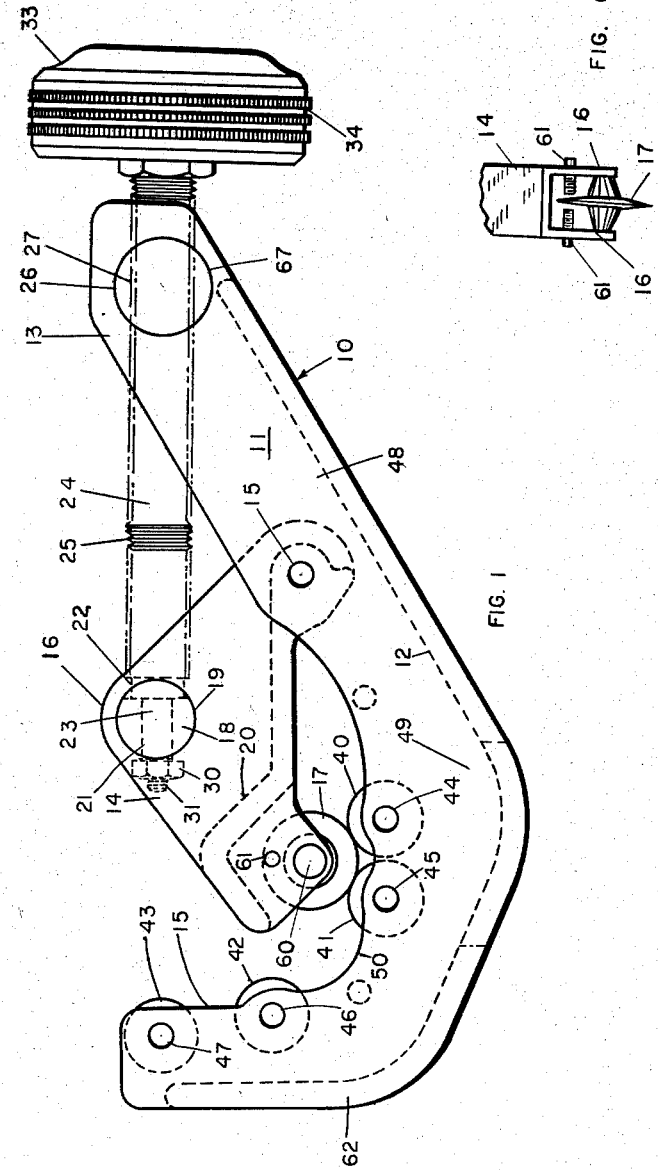
Fig. 1 is a side view of a tubing cutter according to the invention.

Now with more specific reference to the drawings, a tube cutter 10 is shown having a body portion 11 preferably made of a channel shaped member having a web 12 and spaced flanges 13. A lever arm 14 is swingably attached to the body 11 at a pivot point 15 and is made of two spaced plates 16 having a cutting wheel 17 supported on a pivot 60 therebetween. Spaced screws 61 engage threaded holes in the plates 16 and may be tightened against the wheel 17 to hold the wheel 17 against rotation so that it has the effect of a fixed knife. This effect has been found desirable when the device is used to cut rubber hose or similar elastomer materials.

An axle 18 is disposed in holes 19 in the spaced plates 16. The spaced plates 16 are held together by a web 20 which extends therebetween. The axle 18 has a transverse bore 21 which is countersunk at 22 to receive an end 23 of an actuating member 24. The actuating member 24 has threads 25 extending over the enlarged portion thereof and threadably engages a threaded bore 27 through a second axle member 26. The axle member 26 is freely rotatable in bores 67 in the flanges 13. The end 23 is held in place in the axle 18 by means of a nut 30 which threadably engages a reduced size threaded end 31 of the actuating member 24. The other end of the actuating member 24 has a handle 33 attached thereto which facilitates the rotation of the actuating member 24 by the hand of an operator. The handle 33 has a knurled surface 34 on the outside thereof.

Rollers 40, 41, 42, and 43 are supported on the body member 11 between the flanges 13 thereof. The rollers 40, 41, 42, and 43 are freely rotatable about their axles 44, 45, 46, and 47, respectively. The cutter 10 is formed of a straight portion 48 which carries the lever arm 14 and is connected thereto through an upwardly extending portion 62 integral an intermediate portion 49. The portion 49 has the rollers 40 and 41 supported thereon. The upwardly extending portion 62 has the rollers 42 and 43 thereon.

The straight portion 48 of the body member 11 extends at an angle approximately thirty degrees to the longitudinal extending axis of the actuating member 24. The rollers 40 and 41 have their centers disposed at a line generally parallel to the longitudinal axis of the actuating member 24 when the actuating member 24 is in the position shown in Fig. 1. The roller 42 has its axis disposed on the side toward the actuating member 24 of a line drawn perpendicular to the longitudinal axis of the actuating member 24 and through the center of the axle 47. The lever arm 14 will swing the pivot 60 of the cutting wheel 17 through lines comprising the perpendicular bisections of lines through the axles 44 and 45, 45 and 46, 46 and 47, 45 and 47, and 44 and 47, respectively, to engage tubes of various sizes.

Figure 2:
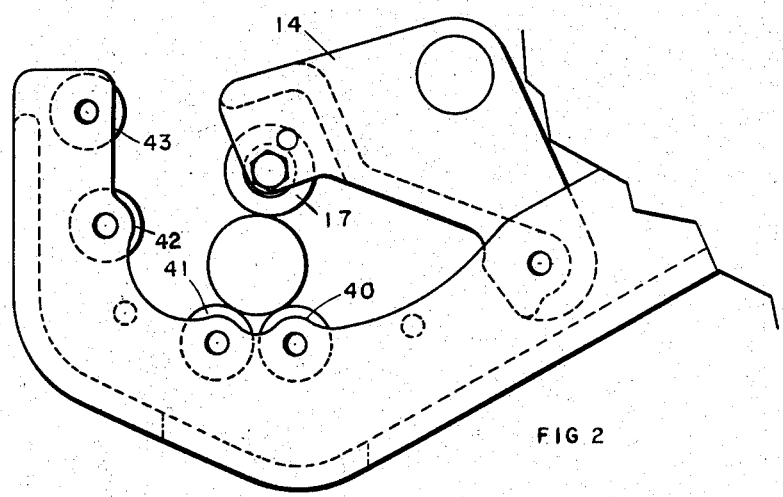
Fig. 2 is a partial view of the tubing cutter similar to that shown in Fig. 1 showing the cutting wheel swung to a position to cut a small tubing.
Figure 3:
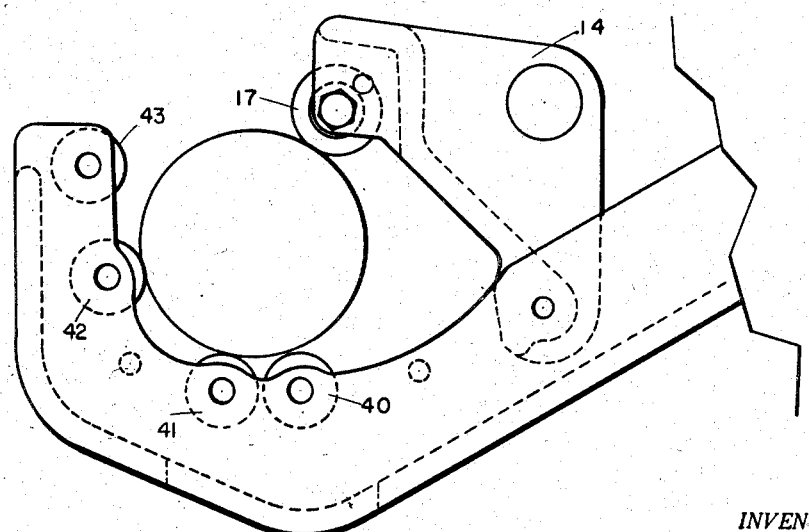
Fig. 3 is another partial view of the tubing cutter showing the cutting wheel swung to a position to cut an intermediate size tubing.
Figure 4:
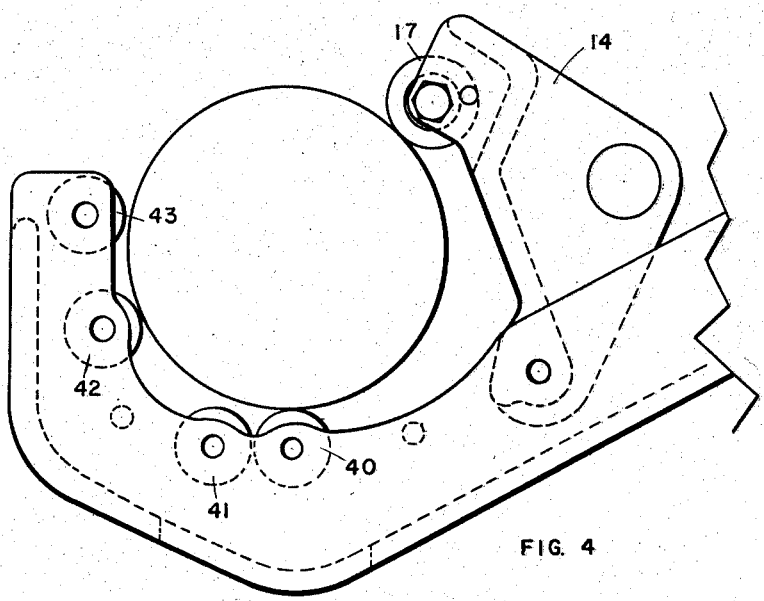
Fig. 4 is a partial view of the tubing cutter showing the cutting wheel swung to a position to cut a large size tubing.
Figure 5:
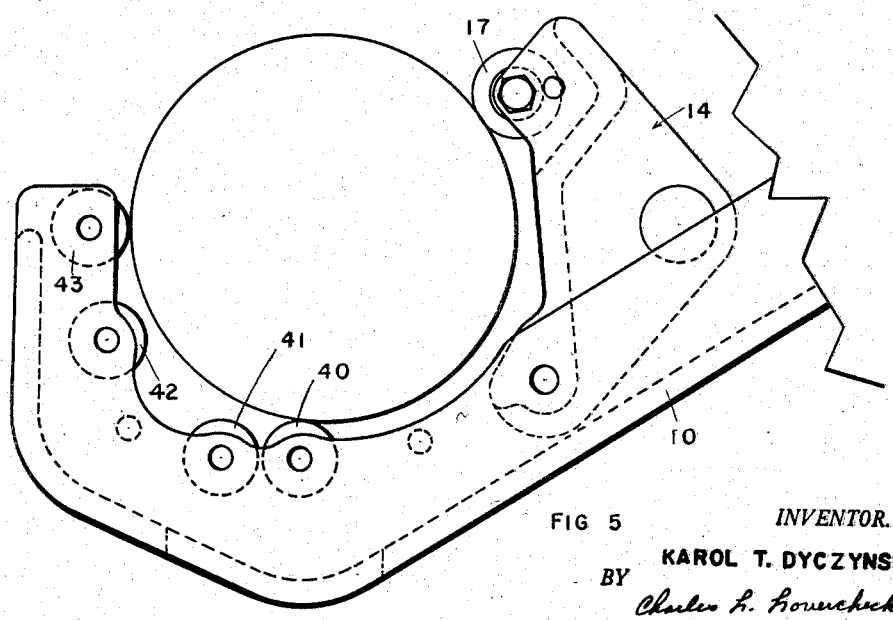
Fig. 5 is a further partial view of the tubing cutter swung into position to cut an extra large tubing.

By way of example in the use of a particular size of tube cutter disclosed herein, the rollers 40 and 41 will be disposed so that the tube engaging them as shown in Fig. 2 will be engaged by the cutting wheel 17 as shown and tubes up to three-quarters of an inch in outside diameter may be cut in this position. Tubes between the sizes from two and one-half inches to three and one-quarter inches will be cut between the rollers 40 and 43 as shown in Fig. 5. In practise, the rollers 40, 41, 42, and 43 may be made in the form of cutting wheels and the wheel 17 could, in this case, be a non-cutting roller.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tube cutter comprising a body member, a lever swingably attached at one end to said body member, means to support a cutting member on said lever, said body member having a first, a second, and a third spaced roller member attached thereto and rotatable about spaced parallel axes, said first and second roller members adapted to engage a tube at two first spaced points thereon and said cutting member adapted to move to a position to engage said tube at a point lying adjacent a perpendicular bisector of a line passing through said two spaced points, said first and third roller members adapted to engage second two spaced points on a larger tube, said cutting member being movable with said lever to a point where it is adapted to engage said larger tube at a point lying adjacent a perpendicular bisector of a line drawn between said second spaced points, a fourth roller member supported on said body member and spaced from said first roller member beyond said second and third roller members, said first and fourth roller members adapted to engage two third spaced points on a tube, said cutting member being movable with said means to engage a point on said tube lying adjacent a perpendicular bisector of a line drawn through said third spaced points, and means to apply pressure to said cutting member to urge it into cutting engagement with said tube, said first roller member being attached to said body member nearest said one end of said lever, said second roller member being attached to said body member beyond said first roller member from said end of said lever, said third roller member being attached to said body member beyond said second roller member from said end of said lever, and said fourth roller member being attached to said body member beyond said first, second, and third roller members from said lever end, said roller members being disposed on said body member in such position that said first and second roller members are positioned on said body member to engage a small pipe to be cut, said first, second, and third roller members engage an intermediate size pipe, said first and third roller members engage a large size pipe, and said first and fourth roller members are positioned on said body member to engage an extra large size pipe to be cut.

2. The tube cutter recited in claim 1 wherein said means to apply pressure to said cutting member comprises a threaded member threadably engaging means on said body member and rotatably engaging said means to support said cutting member.

3. The cutter recited in claim 2 wherein said means on said body member comprises a member having a threaded bore, said member being rotatably mounted on said body member.

4. The cutter recited in claim 3 wherein said means to support said cutting member comprises a lever swingably attached to said body member and said threaded member is attached to a member rotatably attached to said lever at a point spaced from the location of said lever's swingable attachment to said body member.

5. A tube cutter comprising a body member having a first portion and a second portion, said second portion being disposed generally at right angles to said first portion, a first, a second, a third, and a fourth roller supported on parallel spaced axles on said body member, said first and second rollers being disposed on said first portion, said third and fourth rollers being disposed on said second portion, a lever swingably supported on said body member, and an elongated threaded member attached to a complementary threaded member on said body member, said threaded member being attached to said lever, said lever having a cutting wheel on an axle attached to the distal end thereof, said lever being adapted to be urged to swing about its point of attachment to said body member to bring the axle of said cutting wheel to lie substantially on a perpendicular bisector of a line through the axles of said first and second rollers, said lever being further swingable to bring said cutting wheel substantially onto a line representing the perpendicular bisector of a line through the axles of said second and third rollers, said lever being swingable to bring said cutting wheel axle to lie substantially on a perpendicular bisector of a line through said axles of said first and third rollers, said lever being further swingable to bring said cutting wheel axle to lie substantially on the perpendicular bisector of a line through the axles of said first and fourth rollers, said cutting wheel being swingable to another position with its axis lying substantially on a perpendicular bisector of a line through the axes of said second and third rollers.

6. A tube cutter comprising a body made of a curved channel member having two spaced flanges connected by a web, a first, a second, and a third roller supported on spaced parallel axes extending between said flanges, a lever swingable about a pivotal member extending between said flanges, an axle pivotally mounted on said flanges and extending therebetween, an elongated threaded member rotatably attached to means on said lever, and a cutting wheel rotatably supported on a pivot member on the distal end of said lever, said lever being adapted to be urged by said threaded member to move said cutting wheel through the perpendicular bisectors of lines drawn through said first and second rollers, through the axes of said first and third rollers, and through said second and third rollers, and a fourth roller supported on an axle attached to and extending between said flanges and spaced from said first roller beyond said second and third rollers, said cutting wheel being adapted to be swung through the perpendicular bisectors of lines drawn through said axles of said first and fourth rollers and through said second and fourth rollers and said third and fourth rollers, said rollers being disposed on said body in such position that said first and second rollers are positioned on said body to engage a small pipe to be cut, said first, second, and third rollers engage an intermediate size pipe, said first and third rollers engage a large size pipe, and said first and fourth rollers are positioned on said body to engage an extra large size pipe to be cut.

References Cited in the file of this patent

UNITED STATES PATENTS

| | | |
|---|---|---|
| 282,435 | Barnes | July 31, 1883 |
| 287,899 | Barnes | Nov. 6, 1883 |
| 801,866 | Headson | Oct. 17, 1905 |
| 1,118,349 | Johnson | Nov. 24, 1914 |
| 1,380,653 | Kilgour | June 7, 1921 |
| 2,283,572 | Petersen | May 19, 1942 |
| 2,718,058 | Arnold | Sept. 20, 1955 |

FOREIGN PATENTS

| | | |
|---|---|---|
| 405,860 | France | Nov. 25, 1902 |